United States Patent Office 3,574,653
Patented Apr. 13, 1971

3,574,653
HIGH-PURITY SYNTHETIC PITCH
Theodore Edstrom, Parkview, Irwin C. Lewis, Lakewood, and Charles V. Mitchell, Shaker Heights, Ohio, assignors to Union Carbide Corporation
No Drawing. Continuation-in-part of application Ser. No. 196,906, May 23, 1962. This application July 26, 1966, Ser. No. 567,838
Int. Cl. C08h 13/08
U.S. Cl. 106—279
10 Claims

ABSTRACT OF THE DISCLOSURE

A synthetic pitch having a softening point in the range from about 50° C. to about 250° C. and comprising acenaphthene and complex aromatized pyrolysis products of acenaphthylene polymers is produced by heating acenaphthylene to form a solid polymeric mixture, and then further heating the solid mixture so produced to cause it to liquefy and reflux to produce said pitch by pyrolysis of the polymers.

---

This application is a continuation-in-part application of application Ser. No. 196,906, entitled "High-Purity Synthetic Pitch," filed May 23, 1962, now abandoned.

This invention relates to synthetic pitch. In one aspect, this invention relates to a method for producing synthetic pitch.

Coal-tar pitch, normally employed in bonding carbon mixes, is known to be a non-uniform, heterogeneous material of varying composition. Moreover, such pitch compositions contain substantial amounts of impurities like sulfur, nitrogen, oxygen, and inorganic ash.

The varying compositions and the impurity content often render these pitch compositions unsuitable for use with carbon mixes where a high degree of uniformity in the final product is essential, and where extreme purity of the materials is a strict requirement, for example, in certain nuclear industry applications.

It is an object of the present invention to provide a high-purity synthetic pitch.

It is another object to provide a synthetic pitch having reproducible physical and chemical properties.

It is a further object to provide a method for preparing a high-purity synthetic pitch from readily available starting materials.

It is a still further object to provide a method for modifying the softening point of a synthetic high-purity pitch.

Other related objects will become apparent to one skilled in the art upon reference to the ensuing specification and claims.

The aforesaid objects are achieved by a synthetic pitch having a softening point in the range from about 50° C. to about 250° C. and consisting substantially of acenaphthene and a heterogeneous mixture of pyrolyzed acenaphthylene polymers. The softening point of this pitch can be modified by adding thereto acenaphthene or acenaphthylene.

The synthetic pitch of this invention can be prepared by heating acenaphthylene to form a solid polymeric mixture, and then further heating the solid mixture so produced to cause it to liquify and reflux to produce a shiny, black pitch consisting of acenaphthene and a mixture of complex aromatic products by pyrolysis of the polymers. Polymerization of acenaphthylene begins at about 120° C. and is exothermic in nature, with temperatures up to about 325° C. being porduced by the exotherm. Thermal breakdown of the mixture occurs at a temperature in the range from about 270° C. to about 375° C., and the degradation products being to reflux as they are converted to the liquid state. As pyrolysis continues, the reflux temperature is gradually lowered due to degradation of the acenaphthylene polymers until a constant refluxing temperature is attained at about 270° C. Generally, the longer the reflux time, the lower will be the softening point of the resulting pitch. The reflux times can be as short as two hours, or shorter and as long as seventy-two hours, and longer.

Moreover, the heating and refluxing may be carried out in an inert atmosphere or it may be carried out in an oxygen-containing atmosphere. Heating and refluxing in an oxygen-containing atmosphere will result in pitches having a relatively lower softening point for any given pitch preparation.

In a preferred embodiment of the process the polymeric mixture is refluxed for about thirty hours at which time the pitch has a cube-in-air softening point of about 50° C. If a higher softening point is desired, the pitch is then distilled to remove hydrogenated derivatives of acenaphthylene (consisting substantially of acenaphthene) whereby the softening point of the pitch can be raised to any desired value, up to about 250° C.

The acenaphthene produced by the pyrolysis reaction acts as a plasticizer for the pitch, and the amount of acenaphthene therein controls the softening point. The more plasticizer the pitch contains, the lower is its softening point. If it is desired to lower the softening point, additional amounts of acenaphthene, or acenaphthylene, can be added to the pitch.

In the process of the present invention it is believed that the starting material, acenaphthylene, undergoes a vinyl polymerization at temperatures of about 120° C. and higher. Presumably, a linear polymer linked mainly by carbon-to-carbon single bonds is formed according to the schematic reaction

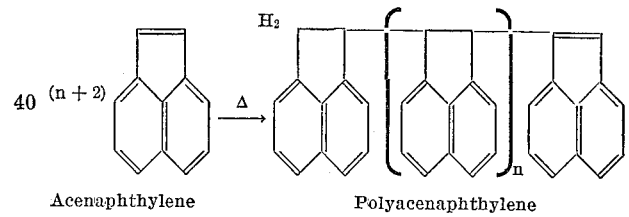

Acenaphthylene      Polyacenaphthylene

As evidenced by the infrared spectra at about 185° C., the product is largely polymeric with a small amount of the monomeric acenaphthylene present. At about 270° C. a substantially complete conversion to the polymeric form has taken place. Thermal breakdown of the polymers commences at about 270° C. to about 375° C. according to the reaction

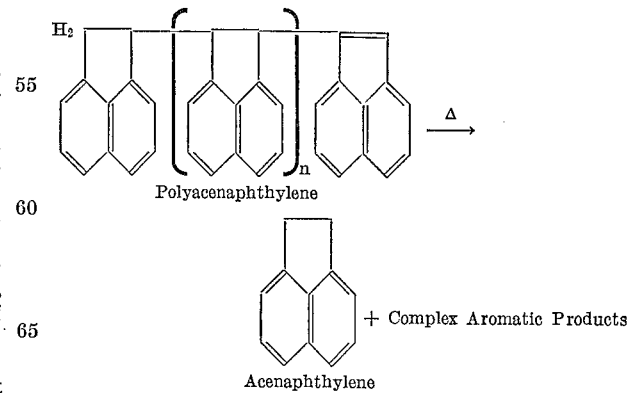

The amount of acenaphthene formed is controlled by the length of the reflux period.

The process of this invention is illustrated by the examples below.

EXAMPLE I

Acenaphthylene (500 grams, 98–100% purity) was charged into a two-liter resin reaction flask which was then fitted with a four-neck ground glass cover. The cover was then fitted with a reflux condenser, a gas inlet tube, a 250 mm. immersion thermometer, and a ground glass stopper. The reaction flask was purged with nitrogen and placed in a heating mantle. The acenaphthylene was heated for about one-half hour under a continuous flow of nitrogen gas through the flask. The temperature at this time was about 120° C. and the acenaphthylene in the flask was molten. After heating for an additional 15 minutes, during which time the temperature reached about 325° C., the molten acenaphthylene was converted to a solid polymer. After an additional heating period of one hour under reflux conditions the solid polymer was completely converted to a molten pitch and the reflux temperature fell to 270° C. where it became constant. A sample of this pitch was withdrawn and was observed to have a cube-in-air softening point of 50° C.

The reflux condenser was then removed from the flask and replaced by a distillation head. The soft pitch contained in the flask was distilled and the distillate collected. The distillation gave 231 grams of a liquid having a boiling point of about 252° C.–265° C. at atmospheric pressure. This liquid was identified as acenaphthene. The pitch residue remaining in the flask had a cube-in-air softening point of about 252° C. This hard pitch was obtained in 51% yield.

EXAMPLE II

The preparation described in Example I was repeated in an oxygen-containing atmosphere, i.e., air. Conversion of acenaphthylene to pitch took place in about one-and-one-half hours. The resulting pitch was maintained at a reflux temperature of about 270° C. for about 40 hours. After this time, the resulting reaction mixture was distilled to give 150 grams of liquid having a boiling point of about 252° C.–265° C. at atmospheric pressure as the distillate. The residue remaining in the flask was a medium pitch having a cube-in-air softening point of about 107° C. The pitch was obtained in 69.0% yield.

EXAMPLE III

Acenaphthylene-based pitch was prepared according to the method described in Example I to give a pitch having a cube-in-air softening point of about 180° C. The pitch yield was 53.4%. The softening point of this pitch was then lowered by adding enough acenaphthene to give a quantity of pitch corresponding to a yield of 63.5%. The addition of acenaphthene was carried out by melting the pitch in a kettle, stirring the pitch, adding the acenaphthene, and continuing the stirring for 15 minutes. After the acenaphthene addition the pitch had a cube-in-air softening point of about 106.5° C. The analytical results of the original pitch and the modified pitch are compiled in Table I below.

TABLE I.—PROPERTIES OF ACENAPHTHYLENE PITCH, BEFORE AND AFTER CUTTING BACK WITH ACENAPHTHENE

| Property | Original | Modified |
| --- | --- | --- |
| Softening point (cube-in-air)° C | 180 | 106.5 |
| Benzene insol., wt. percent | 16.97 | 15.41 |
| Quinoline insol., wt. percent | 0.12 | 1.70 |
| Residual volatile, wt. percent | 22.34 | 37.02 |
| Coking value, wt. percent | 77.66 | 62.98 |
| Carbon, wt. percent | 95.09 | 94.52 |
| Hydrogen, wt. percent | 4.25 | 4.60 |

The properties of acenaphthylene-based pitches as a function of reaction conditions for a series of preparations carried out as hereinabove described are summarized in Table II. Typical analyses of acenaphthylene-based pitches are compiled in Table III.

TABLE II.—SUMMARY OF ACENAPHTHYLENE PITCH YIELDS AND PROPERTIES AS FUNCTION OF REACTION CONDITIONS

| Run No. | Atmosphere | Reflux Time, hrs. | Yields, % Pitch | Yields, % Acenaphthene distillate | Cube-in-air softening point, °C. | 450° C. Coking value %, based on— Pitch | 450° C. Coking value %, based on— Acenaphthylene |
| --- | --- | --- | --- | --- | --- | --- | --- |
| 2 | N₂ | 1 | 51.0 | 49.0 | 251.5 | 88.0 | 44.9 |
| 3 | N₂ | 22 | 54.1 | 46.5 | 173.8 | 82.2 | 44.5 |
| 4 | N₂ | 71 | 60.5 | 39.5 | 146.3 | 75.3 | 45.5 |
| 5 | Air | 41 | 72.8 | 27.2 | 94.3 | 62.7 | 44.2 |
| 6 | Air | 30 | 69.9 | 31.0 | 107.4 | 65.2 | 45.0 |
| 7 | Air | 30 | 71.0 | 29.0 | 103.5 | 63.3 | 44.9 |
| 8 | Air | 30 | 65.8 | 34.2 | 123.3 | 69.3 | 45.6 |

It is readily apparent from the above table that an increase in the amount of acenaphthene distillate, will yield a pitch having a relatively higher melting point. Moreover, physical characteristics of pitch processed in an inert atmosphere and in an oxygen-containing atmosphere are shown. Furthermore, it is seen that the coking value of the pitch can be controlled by control of the pitch softening point.

TABLE III.—TYPICAL ANALYSES OF ACENAPHTHYLENE-BASED PITCHES

| | Run 4 | Run 6 | Run 7 | Run 8 | Run 9 |
| --- | --- | --- | --- | --- | --- |
| Reflux time (hrs. and atmosphere) | 71, N₂ | 30, Air | 30, Air | 30, Air | 30, Air |
| Percent yield | 60.5 | 69.0 | 71.0 | 65.8 | 6.14 |
| Softening point (cube-in-air)° C | 146.3 | 107.4 | 103.5 | 123.3 | 133.5 |
| Benzene insoluble, wt. percent | 10.91 | 4.45 | 5.10 | 7.93 | (¹) |
| Quinoline insoluble, wt. percent | 1.64 | 0.36 | 0.15 | 0.20 | (¹) |
| Residual volatile (850° C.), wt. percent | 28.78 | 40.02 | 41.13 | 36.82 | 32.58 |
| Carbon, wt. percent | 94.77 | 94.43 | 94.50 | 94.54 | (¹) |
| Hydrogen, wt. percent | 4.42 | 4.65 | 4.72 | 4.56 | (¹) |
| Oxygen, wt. percent | 0.39 | 0.37 | 0.34 | 0.38 | (¹) |
| Sulfur wt. percent | None | None | None | None | (¹) |
| Nitrogen, wt. percent | 0.03 | None | 0.03 | None | (¹) |
| Coking value (450° C.), wt. percent | 75.3 | 65.2 | 63.3 | 69.3 | 71.9 |
| Ash, wt. percent | 0.03 | 0.07 | 0.01 | 0.03 | (¹) |
| Specific gravity (air pycnometer) | 1.297 | 1.271 | 1.268 | 1.282 | (¹) |
| Specific gravity (water at 25° C.) | 1.292 | 1.268 | 1.261 | 1.274 | (¹) |

¹ Not available.

Table III sets forth the high purity of of pitch prepared by methods of the present invention. It is noted that the ash and nitrogen contents of the pitch are extremely low and that there is no sulfur present.

The foregoing discussion and examples are intended to be illustrative. Other embodiments within the scope of this invention will readily present themselves to one skilled in the art. For example, a naphthacene-based synthetic pitch can be prepared by heating and refluxing naphthacene according to the hereindisclosed technique.

What is claimed is:

1. A synthetic pitch having a softening point in the range from about 50° C. to about 250° C. and comprising acenaphthene and complex aromatized prolysis products of acenaphthylene polymers, said pitch being produced by a process comprising heating acenaphthylene to form a solid polymeric mixture, and then further heating the solid mixture so produced to cause it to liquify and reflux to produce said pitch by pyrolysis of the polymers.

2. A method for producing acenaphthylene-based synthetic pitch having a softening point in the range from about 50° C. to about 250° C. which comprises heating acenaphthylene to form a solid polymeric mixture, and then further heating the solid mixture so produced to cause it to liquify and reflux to produce said pitch by pyrolysis of the polymers.

3. The method of claim 2 wherein heating and refluxing are carried out in an inert atmosphere.

4. The method of claim 2 wherein heating and refluxing are carried out in an oxygen-containing atmosphere.

5. The method as in claim 2 wherein refluxing is allowed to continue until a constant refluxing temperature is attained.

6. The method of claim 5 wherein heating and refluxing are carried out in an inert atmosphere.

7. The method of claim 5 wherein heating and refluxing are carried out in an oxygen-containing atmosphere.

8. The method as in claim 2 wherein refluxing is allowed to continue until the pitch has a cube-in-air softening point of about 50° C., and the pitch is then distilled to remove acenaphthene and raise the softening point thereof.

9. The method of claim 8 wherein heating and refluxing are carried out in an inert atmosphere.

10. The method of claim 8 wherein heating and refluxing are carried out in an oxygen-containing atmosphere.

References Cited

UNITED STATES PATENTS

| 2,632,749 | 3/1953 | Kaufman et al. | 260—33.6X |
| 3,054,767 | 9/1962 | Quinn | 260—33.6 |

FOREIGN PATENTS

| 725,723 | 1/1966 | Canada | 260—28.5 |

OTHER REFERENCES

Jones, Idris, Plastics From Acenaphthene, In Chemical Trade Journal and Chemical Engineer, July 26, 1946, pp. 97–98, 260—93.5 C.

Kaufman et al. (I), Acenaphthylene: Its Polymers and Copolymers, in Journal of Applied Chem., vol. 1, November 1951, pp. 493, 260—93.5 C.

MORRIS LIEBMAN, Primary Examiner

J. H. DERRINGTON, Assistant Examiner

U.S. Cl. X.R.

208—44; 260—33.6, 93.5